May 7, 1968     S. B. TUWINER     3,381,572

COLORIMETRIC TESTING DEVICE

Filed Dec. 19, 1963

INVENTOR.
SIDNEY B. TUWINER
BY
S. Augustus Somma
ATTORNEY

United States Patent Office 3,381,572
Patented May 7, 1968

3,381,572
COLORIMETRIC TESTING DEVICE
Sidney B. Tuwiner, 8 Lincoln Ave.,
Baldwin, N.Y. 11510
Filed Dec. 19, 1963, Ser. No. 331,843
3 Claims. (Cl. 88—14)

ABSTRACT OF THE DISCLOSURE

One feature of the present invention is a color index unit made of two elements, each rectangularly stepped on one face and flat on the other, the elements being juxtaposed face to face with their flat faces on the outside and parallel to each other. The unit is calibrated to determine the concentration of a chemical in a solution treated with a color indicator. As another feature of the invention, the color index unit is supported in fixed position in a frame which also supports the liquid specimen to be tested, alongside of said unit.

---

The present invention relates to a colorimetric testing device for determining the concentration of certain components of a liquid solution.

The gradations of color produced in certain solutions by the addition of an appropriate coloring indicator is a measure of the concentration of a component of said solution. For example, certain indicators change a solution from one color to another according to the concentration of the hydrogen ions (pH), the concentration of copper ions, or the concentration of chlorine in said solution. To determine such concentration by laboratory means is not possible by those not equipped with the necessary laboratory and/or not having the necessary chemical knowledge to make the determination. It may, for example, be important to the owner of or anyone connected with a swimming pool to determine if the pH of the water in the pool, the amount of purifying chlorine therein, or the amount of algicidal copper sulphate in the water meets requirements. It is important for such a person to have available to him inexpensive means by which he can make the proper determination quickly and simply without resort to complicated chemical procedures.

One object of the present invention is to provide a new and improved colorimetric test device, which can be operated simply and expeditiously through visual color comparisons to determine concentration of certain components in a test specimen solution responsive to coloring indicators, and which lends itself to accurate manufacture by mass production methods, and therefore, is inexpensive to manufacture.

To meet some of the objectives described, the colorimetric test device of the present invention comprises two opposed solid transparent elements, differently colored homogeneously and so configurated and juxtaposed as to form conjointly an optical color index unit in the form of a block or tablet in which light is transmitted sequentially through these elements. The thickness of at least one of the index elements, i.e. its dimension along the direction of light transmission through said element, decreases progressively, either continuously or in steps, towards one end of the element. Desirably both index elements so vary progressively in thickness. The two index elements, so varying in thickness are arranged in reversed relationship, so that the thinner end segment of one index element is optically opposite, and therefore, in the optical path of a segment of the other index element near the thicker end of the latter element. As light is transmitted sequentially through any pair of optically opposed segments of the index elements, these segments will visually appear to have a composite color which is a blend of the two colors of the elements and a function of the respective thicknesses, of the two segments, i.e. a function of the respective and proportionate length of the optical paths through the two elements. For example, if the two index elements are colored red and yellow respectively, the composite section of the elements containing the thinner yellow segment and the thicker red segment in the same optical path will have an orange color hued more strongly towards red, while the composite section of the elements containing the thicker yellow segment of one element and the thinner segment of the other element in the same optical path, will have an orange color hue more strongly towards yellow.

It is seen that the juxtaposed light transmitting elements will conjointly appear to have gradations in one or more of the dimensions of color from one enf of the optical color index unit to the other.

In the embodiment of the present invention, the optical color index unit described is set in a frame adapted to hold also a specimen of the liquid solution to be tested alongside of the unit. The color index unit is calibrated in the different color gradations thereof by comparison with the colors of gauge solutions having known concentrations of one of its components and colored by a predetermined percentage of an indicator color-responsive to said concentrations, to indicate concentration of the component in the test specimen. The same percentage of indicator in the test specimen imparts to the specimen a color, which depends on the concentration of the indicator responsive component in the test specimen to be determined and which corresponds to one of the color gradations in the optical color index unit. For testing, the color of the test specimen of the solution is visually compared to the colors of the different index sections of the optical color index unit. Any one of these index sections having the color of the test specimen will show by its calibration indicium the concentration of the indicator responsive component in the test specimen.

Various other objects, features and advantages of the invention are apparent from the following description and from the accompanying drawings, in which FIG. 1 is a front elevtaion of the colorimeteric testing device embodying the present invention;

FIG. 2 is a vertical section of the colorimetric testing device taken on lines 2—2 of FIG. 1;

FIG. 3 is a vertical section of the colorimetric testing device taken on lines 3—3 of FIG. 1;

FIG. 4 is a perspective of the optical color index unit forming part of the colorimetric testing device; and FIG. 5 is a side elevation of one of the solid index elements of the optical color index unit.

Referring to the drawings, there is provided an optical color index unit 10, set in a frame 11 constructed to permit visual observation of the unit, and adapted to support in full view alongside of the index unit, a specimen 12 to be color-tested, so that the colors of the specimen and of the different sections of the index unit can be visually and readily compared. The optical color index unit 10 consists of two solid transparent elements 13 having the same size and shape. These index elements 13 are desirably made of plastic which lends itself to coloration and to injection molding for accurate mass production. A suitable plastic for that purpose is cellulose propionate.

Each index element 13 is rectangular in outline around its top and sides to define rectangular faces and progressively varies in thickness towards one end of the element. To attain the necessary variation in thickness in each index element 13, one rectangular face 14 of the element is flat and lies in one plane, while the other face 15 has a series of offsets forming steps 16, each having a flat tread 17 parallel to the face 14 and a riser 18 at right angles to said face. The lengths of these treads 17 between risers 18 are substantially equal. As a result of this construction, each index element 13 defines a series of rectangular optical segments 20, 21, 22, 23 and 24, the number of these segments varying according to the size and degree of selectivity of the colorimeter test device required. The specific form of colorimetric test device shown is adapted for use, for example, in testing the waters of a swimming pool, and that purpose, five such segments 20 to 24 would be sufficient.

The two index elements 13 are homogeneously colored differently and the two elements are juxtaposed in opposed face to face relationship with the stepped faces 15 of these elements in confronting nesting relationship and with the thickest end segment 24 of each index element extending beyond and abutting the thinnest end of the other index element. The end optical sections of the color index unit 10 will thereby consist of the unitary segments 24 respectively and therefore, will be monolithic, while the other intermediate optical sections will be compounded of pairs of opposed segments 23 and 20, 22 and 21, 21 and 22, and 20 and 23. The two index elements 13 so arranged, conjointly form the color index unit 10 and serve conjointly to shape said unit into a rectangular tablet having its flat faces 14 parallel and on the outside of the unit and its composite thickness coextensive with the thickness of the end segments 24. Light transmitted through the color index unit 10 from one face 14 to the other will pass through the end segments 24 and through pairs of opposed intermediate segments 20, 21, 22 and 23, of the two index elements 13, and since the two elements are differently colored, the light seen through any pair of opposed segments will have a color which is a composite of the colors of the two index elements, and the dimensions of the color of this light seen through any such pair of segments will depend upon the respective thicknesses of these segments and the ratio between these thicknesses. Since the optical sections of the color index unit 10 are uniform in thickness, the gradations in the colors seen through the different optical sections will depend solely on the ratios of the thicknesses of the segments that make up these segments.

The frame 11 is made of transparent colorless plastic material, which desirably lends itself to manufacture by injection molding, as for example, cellulose propionate, and is in the form of a rectangular block having a pocket 26, rectangularly shaped and dimensioned to conformably and snugly receive the optical color index unit 10. A cover 27 for this pocket 26 cemented to the top wall of the frame 11 serves to retain permanently the optical color index unit 10 in the frame 11. One of the face walls 28 of the frame 11 has a series of calibration indicia 30 along one side of the optical color index unit 10 alongside of the segments 20 to 24 respectively, corresponding in value to the concentrations of the component of the specimen to be determined by the colors seen through the corresponding optical sections of the color index unit 10. In the specific form shown, the indicia 30 correspond to pH values.

The frame 11 also has a test well 31 alongside of the pocket 26 to receive directly therein the specimen 12 to be tested, and having a level mark 32 inscribed on said frame at or above the top of the color index unit 10 to assure the filling of said test well with the specimen to the proper level. If desired, a test tube may be provided which may be filled outside the frame 11 with the test specimen and inserted into the test well 31. In that case, the test tube would have the level mark directly thereon.

In the operation of the colorimetric testing device, assuming that the device is to be employed for the testing of the pH of a liquid, such as the water in a swimming pool, the test well 31 is filled with the water up to the level of the mark 32 to form the specimen 12 and a suitable pH indicator in definite prescribed amounts is added to the water to color the water. The hue of the test water will depend on its pH. Assuming, for example, that the color indicator is phenol red (phenolsulfonphthalein), the test water will turn completely yellow below a pH of about 6.8 and completely red above a pH of about 8.2 and will have different gradations of orange between these hues in the range of pH between these limiting values according to the pH of the test water. The indicia 30 on the frame 11 is shown indicating a pH of 6.8 at the top and 8.2 at the bottom opposite the two end monolithic optical sections of the color index unit 10 respectively and pH's of 7.2, 7.4, 7.6 and 7.8 opposite the intermediate compound optical sections of the color index unit 10 respectively.

Where the color indicator to be employed on the test specimen 12 is phenol red, one of the index elements 13 will be colored homogeneously yellow and the other index element 13 will be colored homogeneously red. The color index unit 10 under these conditions will be set up in the frame 11 with the thickest end of the yellow index element 13 on top to conform with the calibration indicia 30 described, so that the top optical section of the unit will consist solely of the thickest segment 24 of the yellow index element 13, and the bottom optical section of the unit will consist solely of the thickest segment 24 of the red index element 13. Light seen through either of these end monolithic optical sections of the color index unit 10 will be either yellow or red, indicating a pH at the ends beyond the range of 6.8–8.2. Light seen through the intermediate compound optical sections of the color index unit 10 will be orange, the hue depending on the relative thicknesses of the segments in each of these sections, the yellow component of the light seen being more predominate near the top because the thickness of the segment of the yellow index element 13 in this region is thicker than the opposed segment of the red index element 13, and the red component of the light seen being more predominate near the bottom because the thickness of the segment of the red index element 13 in this lower region is thicker than the opposed segment of the yellow index element 13.

The values of the calibration indicia 30, the colors of the index elements 13, the relative thicknesses of the opposed segments of these elements in the different optical sections of the color index unit 10 and the colorations of aqueous solutions having different pH's and having a prescribed concentration of phenol red are so correlated, that the light seen through any optical section of the color index unit 10 will have a color corresponding to that seen through a test specimen having a pH corresponding to that indicated by the calibration indicium 30 alongside of said optical section and having the prescribed concentration of phenol red.

In accordance with a specific example showing how this correlation can be attained, the test well 31 in the frame 11 is filled with 3.5 ml. of an aqueous gauge or standard solution having a pH of 6.8; to this gauge solution is added .20 ml. of phenol red solution containing 2.0 grams per liter of this indicator. One of the index elements 13 is produced so tinted yellow by dye that a match is obtained between the color viewed through the end segment 24 of the element and the color viewed through the gauge solution. Similarly, the other index element 13 is tinted red to match the color viewed through a gauge or standard solution having a pH of 8.2. The steps 16 in the index elements 13 have depths to produce composite colors in the compound optical sections of the color index unit 10 corresponding to colors of gauge solutions having known pH's.

In a specific embodiment of the present invention, the thickness $a$ of segment 20 of each index element 13 is .083 inch, the thickness b of segment 21 is .111 inch, the thickness c of segment 22 is .139 inch, the thickness d of segment 23 is .167 inch and the thickness e of segment 24 is .250 inch. The length of each step 16 between risers 18 is about .325 inch, so that the total length of the index element 13 is about 1⅝ inches. With the colors of the index elements 13 such that they correspond with the colors of aqueous solutions containing 0.0114% of phenol red at pH 6.8 and 8.2 respectively, the intermittent color standards correspond with the solution colors for the same indicator at the same concentration at pH 7.2, 7.4, 7.6 and 7.8.

In the operation of the colorimetric test device described, the solution to be tested is poured into the test well 31 to the level of the mark 32 described, the indicator in the prescribed amount is added to the solution, and the device is held up to a white light to permit visual comparison between the color seen through the solution and the colors seen through the different optical sections of the color index unit 10. The indicium 30 alongside of the optical section of the color index unit showing a color matching that seen through the test solution will indicate the pH of the solution.

Using optical index elements similar in size and shape to the index elements 13 described, but differently colored, the concentrations of other components of a solution may be obtained. For example, with one optical index element colored yellow and the other element colorless, and using o-tolidene (0.1%) as an indicator in the test specimen, the concentration of chlorine in the water, such as that in a swimming pool, can be determined. A gauge solution having 0.9 p.p.m. chlorine and colored with o-tolidine would be yellow and the color seen through the end segment 24 of the yellow index element 13 would be the same. A gauge solution having no chlorine would be colorless in the presence of o-tolidene and that would be the color viewed through the end segment 24 of the colorless index element 13. In the intermediate values of chlorine concentration between the limits described, the gauge solutions would have a yellow color of different tone values or brightness of yellow (light or dark), corresponding gradations in tone values being attained in the color index unit 10 in its compound optical sections by the different combinations of segments of yellow and colorless index elements having different thickness ratios. The optical sections of the color index unit 10 would be calibrated to correspond to 0.0, 0.3, 0.4, 0.5, 0.6 and 0.9 p.p.m. of chlorine.

The determination of more than one component of a test speciment may be made by the same colorimetric test device shown and described, except that instead of employing one color index unit 10 in one pocket 26 on one side of the test well 31 to determine the concentration of one component of a test specimen 12 in said well, the frame 11 has another pocket on the opposite side of the test well 31 to receive another color index 10 colored and calibrated to determine the concentration of another component in a test specimen.

In connection with swimming pool water, it may be desirable to determine the concentration of copper sulphate therein acting as an algicidal agent. The concentration of copper ions in water can be determined by adding dithizone thereto to form copper dithizonate. Dithizone is green and would color the water accordingly in the absence of copper ions, while copper dithizonate is red and would color the water accordingly. In that case, the two optical index elements 13 would be colored red and green respectively to conform with the colorations of an aqueous solution containing no copper and one containing a maximum amount of permissible copper ions. The viewable color compounded from these index elements would be a gray green or gray red with different gradations of green-red depending on the ratio of thickness of the element segments 20 to 23 in the optical compound sections of the color index unit 10.

While the invention has been described with particular reference to a specific embodiment, it is to be understood that it is not to be limited thereto but is to be construed broadly and restricted solely by the scope of the appended claims.

I claim:
1. A colorimetric testing device for determining the concentration of a component of a solution to which has been added an indicator coloring said solution in accordance with the concentration of said component, said device comprising a frame in the form of a block made of transparent material and having a pocket with a pair of parallel internal opposed wall surfaces, an optical color index unit fixed in said pocket in position to be visually observed along its entire color index range in said fixed position through said pair of opposed walls of said pocket, said index unit comprising two transparent solid elements, each having a flat face and an opposite rectangularly stepped face with treads parallel to said flat face, said index elements being homogeneously colored differently and arranged in opposed relationship with the steps of the two elements in mating relationship to permit light to pass through said frame walls and through said elements sequentially, and to form a tablet with opposed external flat parallel faces corresponding in spacing therebetween and in configuration to the internal surfaces of said pocket walls, whereby said unit is retained in said pocket snugly between and conformably with said pocket wall surfaces, index elements through their stepped formations providing segments of different thicknesses in the directions of passage of light sequentially through said elements, whereby different optical sections of said color index unit where said light passes sequentially will appear to have gradations of colors compounded from the colors of said elements at said sections, the color dimensions of said elements and the relative thicknesses of said elements at any optical section being such as to present at each optical section a coloration corresponding to the coloration of a solution having said component in a definite concentration and treated with an indicator color-responsive to the concentration of said component, and calibration indicia means applied to the different optical sections of the color index unit and indicating the concentrations represented by the colorations of the optical sections of the index unit, said frame having a well alongside of said pocket for supporting therein a specimen of the solution to be tested.

2. A colorimetric testing device for determining the concentration of a component of a solution to which has been added an indicator coloring said solution in accordance with the concentration of said component, said device comprising a frame, an optical color index unit supported on said frame in fixed position to be visually observed while in said position through said frame along the entire color index range of said index unit, said index unit comprising two transparent solid index elements homogenously colored differently and arranged in opposed relation to permit light to pass through said elements sequentially, each of said index elements having one flat face and having an opposite face rectangularly stepped with treads parallel to said flat face to form segments of different thicknesses, said elements being similar in size and shape in their stepped regions and being juxtaposed face to face with the stepped faces confronting and nested into conforming engagement to form conjointly a tablet of uniform composite thickness with said flat faces on the outside of the tablet and parallel to each other, said elements conjointly defining a series of optical sections arranged along said tablet, each section being a composite of a pair of juxtaposed steps, whereby each optical section of said color index unit where the light passes sequentially from one element to the other at right angles to said flat faces will appear to have color dimensions compounded from the color dimensions of the elements at the latter section, and the color dimensions of the different optical sections will be discontinuously graduated, the color dimensions of said elements and the relative thicknesses of said elements at any optical section of said unit being such as to present at each optical section a coloration corresponding to the coloration of a solution having said component in a definite concentration and treated with an indicator color-responsive to the concentration of said component, and calibration indicia means directed to the different optical sections of the color index unit and indicating the concentrations represented by the colorations of the optical sections of the index unit, said frame having means for supporting thereon a test specimen of the solution containing the component whose concentration is to be determined alongside of said color index unit in visual position for color comparison with the different optical sections of said color index unit.

3. A colorimetric testing device as described in claim 2, said frame being in the form of a rectangular block and being made of transparent material, said frame having a rectangular pocket for snugly receiving said color index unit, said calibration indicia means comprising a series of calibration indicia on the face of said frame along one side of the color index unit, said means for supporting a test specimen of the solution comprising a test well in said frame alongside of said pocket.

References Cited

UNITED STATES PATENTS 2,835,412 5/1958 Clurman _____ 88—14 X
2,916,968 12/1959 Jackson _____ 350—314

FOREIGN PATENTS 390,488 7/1931 Great Britain.

OTHER REFERENCES

Shaxby, J. H., "A Simple Form of the Nagel Anomaloscope," J. of Scientific Instruments, January 1945, vol. 22, pp. 15–16.

JEWELL H. PEDERSEN, *Primary Examiner.*

W. A. SKLAR, *Assistant Examiner.*